United States Patent
Holtermann

[11] Patent Number: 5,970,945
[45] Date of Patent: Oct. 26, 1999

[54] BARRIER DIVIDED COMBUSTION CHAMBER FOR FUEL INJECTION TWO-STROKE ENGINE

[75] Inventor: Theodore J. Holtermann, Brookfield, Wis.

[73] Assignee: Outboard Marine Corporation, Waukegan, Ill.

[21] Appl. No.: 09/021,800

[22] Filed: Feb. 11, 1998

[51] Int. Cl.[6] .................................................. F02B 19/04
[52] U.S. Cl. ........................ 123/259; 123/276; 123/279
[58] Field of Search .................... 123/295, 259, 123/276, 279

[56] References Cited

U.S. PATENT DOCUMENTS

| | | | |
|---|---|---|---|
| 1,434,448 | 11/1922 | Mowbray . | |
| 2,632,432 | 3/1953 | Potter | 123/191 |
| 3,186,395 | 6/1965 | Fuka | 123/295 |
| 3,452,726 | 7/1969 | Szymanski | 123/276 |
| 3,923,015 | 12/1975 | Mukai et al. | 123/259 |
| 4,164,915 | 8/1979 | Kulhavy et al. | 123/259 |
| 4,170,966 | 10/1979 | Schmidt | 123/279 |
| 4,235,203 | 11/1980 | Thery | 123/275 |
| 4,359,027 | 11/1982 | Scharpf | 123/307 |
| 4,557,231 | 12/1985 | Thery | 123/279 |
| 4,788,942 | 12/1988 | Pouring et al. | 123/26 |
| 5,163,395 | 11/1992 | Ishii | 123/257 |
| 5,195,486 | 3/1993 | Ishii | 123/257 |
| 5,373,820 | 12/1994 | Sakamoto et al. | 123/295 |

FOREIGN PATENT DOCUMENTS

| | | | |
|---|---|---|---|
| 165624 | 3/1950 | Austria | 123/279 |
| 783744 | 7/1935 | France | 123/259 |

Primary Examiner—Erick R. Solis
Attorney, Agent, or Firm—Fletcher, Yoder & Van Someren

[57] ABSTRACT

An internal combustion engine having a combustion chamber divided into two regions by an arcuate barrier on the top of the piston and a complementary arcuate barrier formed in a cavity of the cylinder head. When the piston is at top dead center, the combustion chamber is effectively divided into two portions with approximately ten percent of the chamber being in the vicinity of a fuel injector and a spark plug. By this structure, the engine minimizes the amount of fuel used at idle and at very low power levels, and yet engine performance at higher power levels is not affected.

8 Claims, 3 Drawing Sheets

BARRIER DIVIDED COMBUSTION CHAMBER FOR FUEL INJECTION TWO-STROKE ENGINE

BACKGROUND OF THE INVENTION

1. Field of the Invention

The present invention relates to an internal combustion engine and, more particularly, to an internal combustion engine having an improved combustion chamber design and method which effectively divides the chamber into two portions having a volume ratio of about 9 to 1 when the piston is at the top of its travel, thereby resulting in greater fuel efficiency at idle and very low power settings.

2. Description of the Related Art

There has been a long continuing effort to design internal combustion engines to be more fuel efficient and environmentally effective. See for example, U.S. Pat. No. 1,434,448, U.S. Pat. No. 2,632,432, U.S. Pat. No. 4,235,203, U.S. Pat. No. 4,359,027, U.S. Pat. No. 4,788,942, U.S. Pat. No. 5,163,395 and U.S. Pat. No. 5,195,486. All of these patents show combustion chambers of different shapes created by protrusions from or indentations in the top surface of a piston and/or various wall arrangements in the cylinder head.

In two-stroke engines, used extensively for outboard and inboard boat engines, motorcycles, personal watercraft and snowmobiles, power generation consists of a compression stroke where the piston travels up the cylinder to compress a charge either of air or of pre-mixed air and fuel. If just air is compressed, then fuel is injected. Ignition usually occurs before the piston reaches the top of its travel, called the top dead center (TDC), or at TDC. Simultaneously, the region under the piston, the crankcase, is able to draw in a new charge of air or an air-fuel mix. After ignition, the exploding mixture raises the temperature and pressure in the cylinder and forces the piston downwardly. This downward movement turns the crankshaft and also compresses the charge in the crankcase, beneath the piston. As the piston approaches its lowest position, the bottom dead center (BDC), an exhaust port is uncovered allowing the newly formed exhaust gases of the combustion process to leave the cylinder and then a moment later a transfer or inlet port is uncovered allowing a new charge of air or an air-fuel mix to enter into the cylinder. The new charge provides combustion material for the next power stroke and also helps expels exhaust gases in the cylinder. Often, the top of a piston in two stroke engines includes a deflector causing the new charge to be directed upwardly into the cylinder and around to the opposite side in a flow mechanism which is often called "cross-scavenging".

For a given size engine operating at a particular speed, the two-stroke engine is more powerful than a four-stroke engine since the two-stroke engine has twice as many power strokes per unit of time. Unfortunately, the fuel efficiency of a two-stroke engine is very likely to be lower than that of a four-stroke engine. Since the 1920s attempts have been made to optimize efficiency of two stroke engines and many different techniques have been utilized.

While efficiency of two stroke engines have improved over the years, continuing efforts are being made to further improve efficiency in an effort to produce an optimal engine.

BRIEF DESCRIPTION OF THE INVENTION

An improved two-stroke internal combustion engine is provided here comprising an engine block having a cylinder formed therein; a piston movable in the cylinder; and a cylinder head having a cavity connected to said engine block for forming therewith a combustion chamber, the piston having a generally cylindrical body, a top surface and an off-center barrier formed in the top surface, and the cylinder head including a barrier disposed generally opposite to the barrier of the piston and forming therewith, when the piston is at top dead center in the cylinder, first and second portion in the combustion chamber wherein the first portion is approximately 10% of the total volume of the combustion chamber.

The invention herein also includes a method for improving the fuel economy of an internal combustion engine at or near idle comprising the steps of providing an engine block having a cylinder, a piston adapted to move in a reciprocal manner in the cylinder and a cylinder head with a cavity, wherein the engine block, the cylinder head and the piston forming a combustion chamber; dividing the combustion chamber into two portions in the ratio of approximately 9 to 1 by volume; and placing means for injecting and means for igniting the fuel in the smaller of the two portions.

An object of the present invention is to provide a two-stroke internal combustion engine that has physical stratification of the fuel/air charge at idle and at very low power levels. Another aspect of the present invention is to provide a two-stroke internal combustion engine with improved fuel efficiency. Still another advantage of the present invention is to provide a two-stroke internal combustion engine that improves efficiency at engine idle and at very low power settings while not having an adverse affect on engine performance at higher power settings. Yet a further aim of the present invention is to provide an efficient two-stroke internal combustion engine which is reliable and relatively inexpensive. Still another object of the present invention is to provide a two-stroke engine having a divided combustion chamber in the ratio of approximately 9 to 1 by volume with fuel being restricted to the smaller volume at idle and at very low power settings.

A more complete understanding of the present invention and other objects, aspects, aims and advantages thereof will be gained from a consideration of the following description of the preferred embodiment read in conjunction with the accompanying drawings provided herein.

DESCRIPTION OF THE PREFERRED EMBODIMENT

Figure 1:
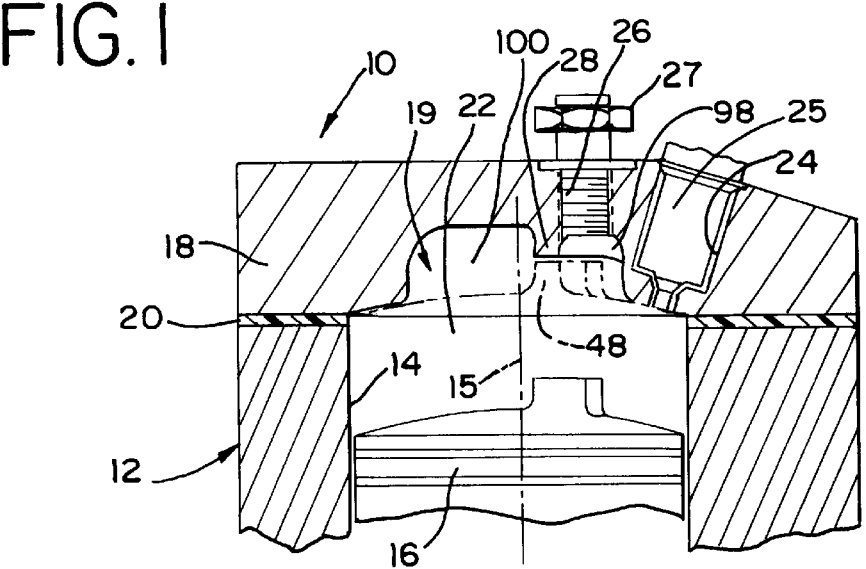
FIG. 1 is a sectional elevational view of a portion of a two-stroke internal combustion engine showing in diagrammatic form the interior of a portion of a cylinder of the present invention.

While the present invention is open to various modifications and alternative constructions, the preferred embodiment shown in the drawings will be described herein in detail. It is to be understood, however, that there is no intention to limit the invention to the particular form disclosed. On the contrary, the intention is to cover all modifications, equivalent structures and processes, and alternative constructions falling within the spirit and scope of the invention as expressed in the appended claims.

What is to be described is a combustion chamber configuration which improves the efficiency of a two-stroke internal combustion engine while the engine is idling or at very low power settings. At idle, generally the engine only needs enough power to overcome its own friction. However, internal combustion engines typically have more air in their combustion chambers than is needed for combustion to run efficiently at idle or low power settings. The quantity of air typically determines the quantity of fuel needed since an insufficient amount of fuel means the charge is too lean for combustion. The central concept of the present invention is to restrict the amount of air that is present in the vicinity of the spark plug so that a lesser amount of fuel is used to mix with that air prior to ignition by the spark plug. By using an upstanding barrier on the top or crown of the piston and by having a complimentary downwardly directed barrier as part of the cylinder head, when the piston reaches its most extended upward position, top dead center, where the volume of the combustion chamber is at a minimum, there is a generally effective division of the combustion chamber into two portions, spaces or volumes, a relatively small portion immediately adjacent the spark plug to one side of the barriers and a relatively large portion on the opposite side of the barriers.

The approach used here to determine the relative volumes of the two spaces requires the calculation of the fuel rate required at idle and at very low power levels for efficient yet smooth operation. Next, the quantity of air in the combustion chamber is determined. Thereafter, a determination is made of the quantity of air needed by the fuel at idle and at low power setting, and thereafter, what percentage of the whole does that amount of air represent. It has been found that approximately ten percent of the air in the combustion chamber is required to be mixed with the required amount of fuel to provide sufficient power to keep the engine idling smoothly. In addition to operation at idle or very low power settings, there is also a need to prevent interference with operations of the engine at higher power settings or even at full throttle. For example, having a high barrier on the piston may be desirable at idle but at high power settings, it is likely to get too hot and burn away.

As will be described below, the barrier of moderate height, a fuel injector and the spark plug are concentrated in approximately a single quadrant, on the side of the cylinder away from the exhaust port. The internal combustion engine of the present invention runs smoothly and efficiently at idle and at very low power settings and yet does not affect the engine's reliability nor the operation of the engine at high power settings. The engine also has improved fuel efficiency and allows earlier injection of the fuel to enhance combustion.

Referring now to FIG. 1, there is shown a portion of an internal combustion engine 10 including an engine block 12 having a cylinder 14 formed in the block. Moving back and forth in the cylinder in a direction parallel to a longitudinal axis 15 of the cylinder is a piston 16. A cylinder head 18 with a cavity 19 is attached to the block at the top of the cylinder and a gasket 20 separates the cylinder head from the engine block. The space above the piston and the cavity forms a combustion chamber 22. Formed in the cylinder head and in communication with the combustion chamber is a first opening 24 for mounting a fuel injector nozzle 25 and a second opening 26 for mounting a spark generating element, such as a spark plug 27.

Figure 6:
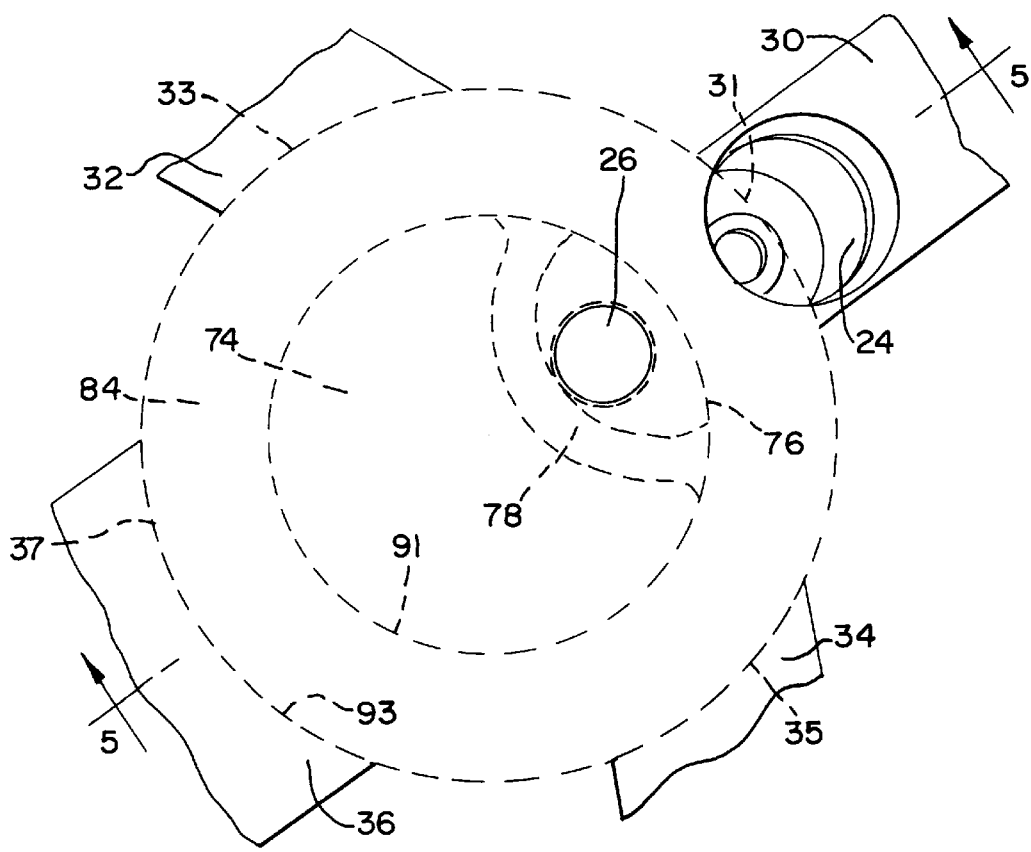
FIG. 6 is a diagrammatic top plan view of the cylinder of the present invention showing the transfer and exhaust ports of the internal combustion engine of the present invention.

Referring briefly to FIG. 6, there is shown in diagrammatic form three transfer passages 30, 32, 34 and respective transfer ports 31, 33, 35, at the cylinder and an exhaust passage 36 and an exhaust port 37, also in communication with the cylinder.

Figure 2:
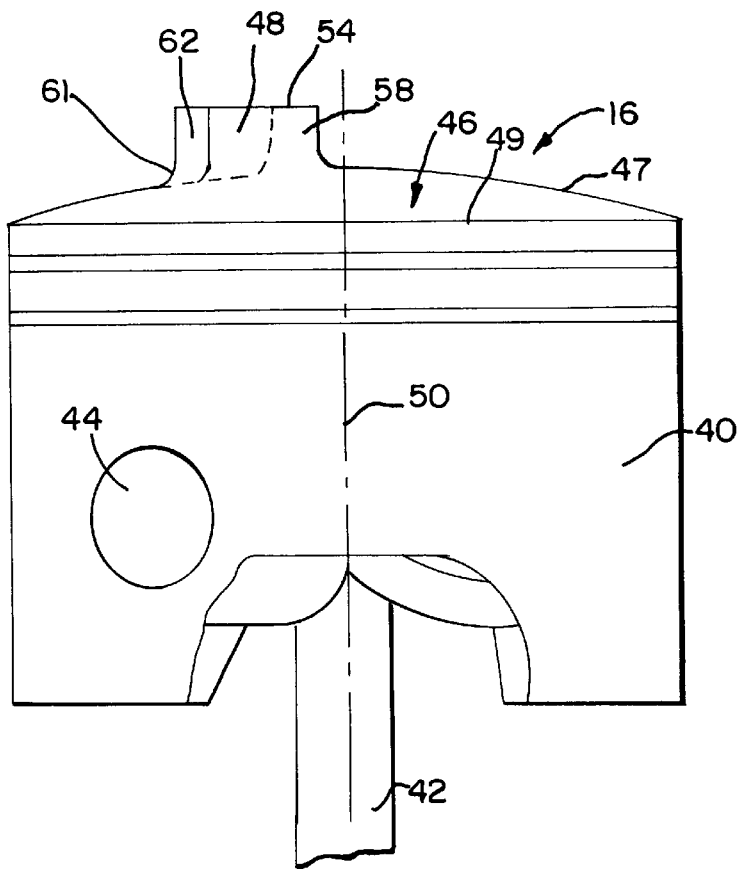
FIG. 2 is an enlarged diagrammatic side elevational view of a piston of the present invention.
Figure 3:
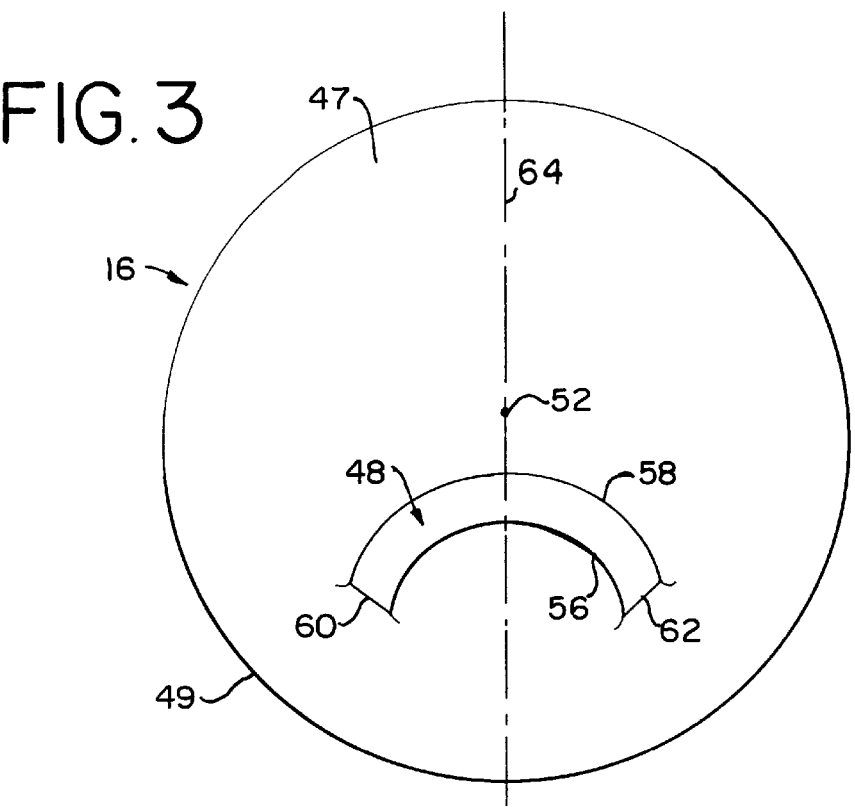
FIG. 3 is a top plan view of the piston shown in FIG. 2.
Figure 4:
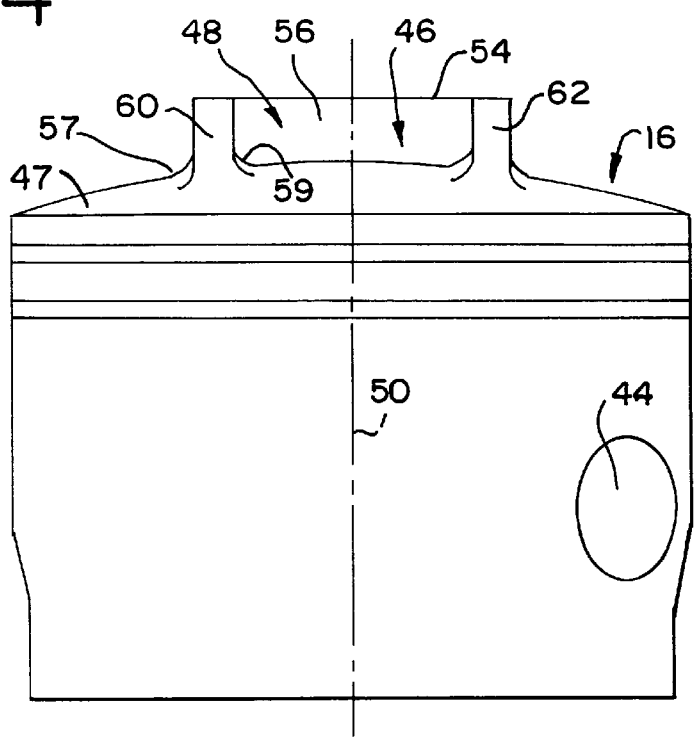
FIG. 4 is a front elevational view of the piston shown in FIGS. 2 and 3.

Referring now to FIGS. 2, 3 and 4, the piston 16 is illustrated in more detail. The piston includes a generally cylindrical body 40 which is attached to a connecting rod 42 by way of a wrist pin (not shown) which is received by an opening 44. A top or crown 46 of the piston has a generally convex surface 47, a periphery 49 and includes an upstanding, arcuate, off-center piston barrier 48. The longitudinal axis of the piston and the center of the piston is depicted by a phantom line 50 in FIGS. 2 and 4 and by a point 52 in FIG. 3.

In a preferred embodiment, the piston has a diameter of approximately 3.60 inches, a height of approximately 3.213 inches and a dome radius for the convex surface 47 of approximately 5.79 inches. The center 51 of the wrist pin opening 44 is approximately 55° from a plane represented by the line 64 which bisects the piston and the barrier in half and intersects the mid-point of the exhaust port. The barrier is off-set from the center point 52 of the piston and is positioned so as to be facing away from the center. The barrier has a concave inner surface 56 facing the periphery 49 of the piston. This inner surface has a radius of about 0.65 inches. The barrier includes an outer surface 58 which has a radius of approximately 0.90 inches. The centers of these radii are approximately 1.04 inches offset from the center 52. The barrier thickness is approximately 0.25 inches. The barrier has two opposing end walls 60, 62 and each end wall is generated by a radius of approximately 1.14 inches with a center point offset by approximately 0.06 inches from the piston center 52 in a direction opposite that of the center points of radii for the inner and outer surfaces of the barrier. The arc of the barrier extends approximately between 140 degrees and 160 degrees in length as best shown in FIG. 3. The height of the barrier from a top surface 54 of the barrier to the upper-most portion of piston surface 47 is about 0.35 inches or roughly ten percent of the diameter of the piston. Transition surfaces 57, 59, 61 have radii of about 0.125 inches while the upper part of each wall ends 60, 62 has a radius of about 0.50 inches with a center point about 0.54 inches from the periphery 49. The stroke of the piston is 2.588 inches so that the ratio of barrier height to stroke is approximately in the range of 1 to 7 to 1 to 8.

Figure 5:
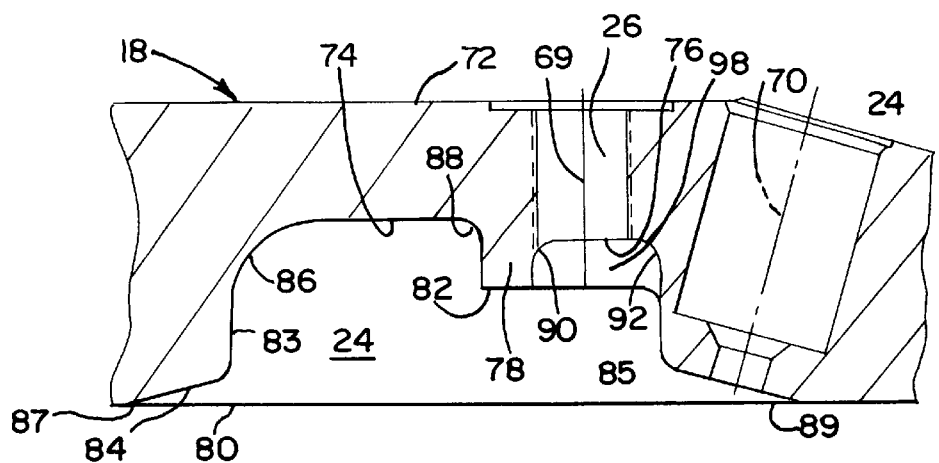
FIG. 5 is an enlarged, partial, elevational, sectional view of the cylinder head shown in FIG. 1.

Referring now to FIGS. 5 and 6, the cylinder head is shown in more detail. Included is the opening 24 for the fuel injector nozzle in which a central axis 70 of the opening is offset from the longitudinal axis 15 of the cylinder by about 16 degrees. The opening 26 for the spark plug has a longitudinal axis 69 parallel to the axis 15 of the cylinder but is offset by about 0.68 inches measured from the axis of the cylinder to the axis of the opening 26. The central axis 70 of the nozzle opening 24 is about 1.972 inches from the center line of the cylinder when measured on a straight line coincident with an upper surface 72 of the cylinder head.

The interior or cavity of the cylinder head is divided into two portions, spaces or volumes by virtue of a deeply recessed surface 74 to the left side when viewed in FIG. 5 and the less deeply recessed surface 76 which is toward the right side. Between these two surfaces is a downwardly extending cylinder head arcuate barrier 78 which mirrors the piston barrier 48.

The maximum dimension of the recessed surface 74 from a bottom surface 80 of the cylinder head is approximately 1.00 inches; the maximum dimension of the surface 76 from the bottom surface 80 is approximately 0.875 inches. The distance between the bottom surface 80 and a bottom surface 82 of the barrier 78 is approximately 0.625 inches. The peripheral portions of the cylinder head interior is formed by a curved ring shaped surface 84 having a diameter from point 87 (the intersection of the surfaces 84 and 80) to point 89 (the intersection of the same surfaces at the opposite side of the chamber) of approximately 3.609 inches. The curve of the surface 84 is generated by a radius of about 5.79 inches. The surface 84 is bordered by the two circles 91 and 93 shown in dotted lines in FIG. 6. The radius of a transition surface 86 is approximately 0.50 inches, whereas three other transition surfaces 88, 90 and 92 each have a radius of approximately 0.125 inches. The diameter of the cylinder head cavity from a vertical surface 83 on one side of the combustion chamber to a vertical surface 85 on the opposite side, and represented by the circle 91 is approximately 2.36 inches. The parts of the cylinder head barrier 78, such as an interior wall, an exterior wall and the width thickness, are of similar dimensions to those of the piston barrier 48.

Referring now to FIG. 1, the piston 16 is shown in two positions, in solid line where the piston is part way between the bottom dead center position and the top dead center position, and in phantom line where the piston is at the top dead center position (TDC). As can be seen, the piston barrier 48 is very close to the cylinder head barrier 78 whereby the combustion chamber 22 is effectively divided into two portions 98, 100. The design distance is 0.05 inches. The fuel rate required at idle is about 3 to 3.5 milligrams per shot, which is just sufficient to provide enough energy for the piston to overcome the internal friction of the engine. Thereafter, the amount of air that is necessary to support combustion is calculated. It has been determined that only about 10% of the air is needed for combustion at idle. To segregate 10% of the air in the combustion chamber, the barriers divide the combustion chamber into a small region or portion 98 and a large region or portion 100. The affect is somewhat analogous to reducing the combustion chamber at the time of combustion to roughly 1/10 of its actual size.

A major advantage of the present invention is that the fuel efficiency is enhanced without any adverse affect on the operation of the engine when it is at higher power levels. Another advantage is that the fuel will burn efficiently and thereby reduce the amount of unburnt fuel dispensed out the exhaust. With the barrier injection of fuel may be sooner in the cycle and thereby give the fuel more time to vaporize. Still another advantage of the inventive structure is that the height of the barrier is sufficient to trap the fuel but not so great as to heat excessively and burn away or require expensive efforts at cooling.

It is contemplated that the beginning of fuel injection will occur when the crankshaft is between about 30° to 15° before the piston is at TDC. This will allow the fuel to complete injection, travel to the top surface of the piston and vaporize. However, fuel injection could occur at a crankshaft angle of 50° to 60° before TDC. The spark plug fires approximately between 10° before TDC and TDC. It is desirable to have the top surface 54 of the piston barrier disposed in the cylinder head cavity, that is, beyond the bottom surface 80 of the cylinder head, at the start of fuel injection so that the fuel tends to remain trapped in the small region 98. Another advantage of the barrier structure relates to timing. Existing timing is based on events until the engine RPM exceeds 2000. Thereafter, timing is based on crankshaft position. With the barrier structure, timing may be based on crankshaft angle through the entire power setting range.

It is to be understood that the barriers are not intended to interfere with conventional Schnurle or loop scavenging and is sized and located to minimize any adverse affect on scavenging flow in the cylinder. The fuel injector is located to spray fuel toward the piston and the inner surface 56 of the piston barrier 48. The piston barrier prevents fuel from splashing or ricocheting toward the exhaust port. As the piston ascends, the piston barrier will help keep the fuel vapor formed on the intake or transfer side of the cylinder. As the piston approached top dead center and squish begins to occur between the surface 84 of the cylinder head and the periphery of the piston, the combustion chamber will be distinctly divided into the two portions 98, 100 with the bulk of the fuel vapor in the smaller portion 98. This forms a rich fuel zone in which to have combustion.

A major advantage of having the combustion chamber structured as described is that a minimum amount of fuel is carried out of the exhaust port, and the stratification of the combustion charge results in improved ignition and combustion efficiency. Other techniques used to achieve some of the effects just described include a cup in the piston surface, but that type of approach does not result in the same squish action and it may be difficult to scavenge the interior of the cup.

The specification describes in detail an embodiment of the present invention. Other modifications and variations will, under the doctrine of equivalents, come within the scope of the appended claims. For example, changing the extent of the arc of the piston barrier, making the barrier thicker or taller, or changing the radii of the inner and outer surfaces are all considered equivalent structures. Changing the shape of the barrier from an arc to a linear segment will also be considered to be an equivalent structure. Still other alternatives will also be equivalent, as will many new technologies. There is no desire or intention here to limit in any way the application of the doctrine of equivalents to this invention.

I claim:

1. An internal combustion engine comprising:

an engine block having a cylinder formed therein;

a piston movable in said cylinder;

a cylinder head having a cavity connected to said engine block for forming therewith a combustion chamber;

said piston having a generally cylindrical body, a top surface and an off-center barrier formed in said top surface;

said cylinder head including a barrier disposed generally opposite to said barrier of said piston and forming therewith, when said piston is at top dead center in the cylinder, first and second portions in said combustion chamber wherein said first portion is approximately 10% of the total volume of the combustion chamber;

a first opening in said cylinder head for receiving a fuel injector nozzle mounted to inject fuel into said first portion when said piston is at or near top dead center; and a second opening in said cylinder head for receiving a spark generating element mounted to ignite the fuel in said first portion when said piston is at or near top dead center;

said piston having a top surface which is circular in plan view and having a center and a periphery;

said barrier of said piston being located between said center and said periphery; and said barrier having a concave surface facing away from said center.

2. An apparatus as claimed in claim 1 wherein:

said first and said second openings are adjacent one another and communicate with said first portion of said combustion chamber.

3. An apparatus as claimed in claim 1 wherein:

said barrier of said piston is arcuate and extends along an arc from approximately 140 degrees to 160 degrees in length.

4. An apparatus as claimed in claim 3 wherein:

the inner radius of said arcuate barrier of said piston is approximately 36 percent of the radius of said piston.

5. An apparatus as claimed in claim 4 wherein:

the outer radius of said arcuate barrier of said piston is approximately 50 percent of the radius of said piston.

6. An apparatus as claimed in claim 1 wherein:

the height of said barrier of said piston above said top surface of said piston is approximately 10 percent of the diameter of said piston.

7. An apparatus as claimed in claim 1 wherein:

the height of said barrier of said piston above said top surface of said piston is approximately in the range from 1 to 7 to 1 to 8 compared to the stroke of said piston.

8. An apparatus as claimed in claim 1 including:

an exhaust port in said cylinder wall and wherein said barrier of said piston is aligned to the opposite side of said cylinder from said exhaust port.

\* \* \* \* \*